United States Patent [19]
Giraud

[11] Patent Number: 5,976,656
[45] Date of Patent: Nov. 2, 1999

[54] SHOCK DAMPER COATING

[75] Inventor: André Giraud, Levallois-Perret, France

[73] Assignee: Institut Français du Pétrole, France

[21] Appl. No.: 08/836,646

[22] PCT Filed: Nov. 15, 1995

[86] PCT No.: PCT/FR95/01498

§ 371 Date: May 15, 1997

§ 102(e) Date: May 15, 1997

[87] PCT Pub. No.: WO96/15388

PCT Pub. Date: May 23, 1996

[30] Foreign Application Priority Data

Nov. 16, 1994 [FR] France .................................. 94 13723

[51] Int. Cl.$^6$ .................................................. B32B 7/04
[52] U.S. Cl. ........................ 428/44; 2/2.5; 89/36.01; 89/36.02; 428/48; 428/49; 428/52; 428/192; 428/911
[58] Field of Search ................................. 428/44, 52, 48, 428/49, 911, 192; 2/2.5; 89/36.01, 36.02

[56] References Cited

U.S. PATENT DOCUMENTS

| | | | |
|---|---|---|---|
| 2,279,110 | 4/1942 | Collins | 89/36 |
| 2,723,214 | 11/1955 | Meyer | 428/911 |
| 3,563,836 | 2/1971 | Dunbar | 428/911 |
| 3,616,115 | 10/1971 | Klimmek | 89/36 |
| 3,813,281 | 5/1974 | Burgess | 428/911 |
| 3,867,239 | 2/1975 | Alesi | 156/258 |
| 4,090,011 | 5/1978 | Barkman | 428/653 |
| 4,131,053 | 12/1978 | Ferguson | 428/469 |
| 4,241,457 | 12/1980 | Klein | 428/911 |
| 4,483,020 | 11/1984 | Dunn | 2/2.5 |
| 4,868,040 | 9/1989 | Hallal et al. | 428/251 |
| 4,923,728 | 5/1990 | Snedeker | 428/52 |
| 5,326,606 | 7/1994 | Labock | 428/49 |

FOREIGN PATENT DOCUMENTS

| | | |
|---|---|---|
| 0251395 | 1/1988 | European Pat. Off. . |
| 1113 396 | 12/1955 | France . |
| 1566 448 | 3/1969 | France . |
| 2140 701 | 12/1972 | France . |
| 1578336 | 3/1972 | Germany . |
| 3716055 | 12/1988 | Germany . |
| 444 568 | 3/1936 | United Kingdom . |
| 1142689 | 2/1969 | United Kingdom . |
| 2004177 | 3/1979 | United Kingdom . |
| WO-A-9321492 | 10/1993 | WIPO . |

OTHER PUBLICATIONS

International Search Report for International Application No. PCT/FR95/01498 dated Feb. 16, 1996.

International Search Report for International Application No. PCT/GB 93/00770 dated Jun. 29, 1993.

European Search Report for European Application No. EP 87 20 1181 dated Aug. 17, 1987.

English–language version of International Preliminary Examination Report completed Jan. 21, 1997.

*Primary Examiner*—Nasser Ahmad
*Attorney, Agent, or Firm*—Akin, Gump, Strauss, Hauer & Feld

[57] ABSTRACT

The damper coating for shocks produced by a collision, or impacts produced by a shockwave, contains at least one layer of a crushing material (2) intended to cover a surface to be protected, the external layer of the crushing material (2) being, according to the present invention, covered by a skin (4) capable of providing a widening of the area affected by the shock or impact. The skin (4) contains, in particular, several layers ($5_1$; $5_2$; $5_3$) of scales ($6_1$; $6_2$; $6_3$), the scales of one layer being offset in staggered rows with respect to the scales of the following layer and being separated from the neighbouring scales of the same layer or capable of being separated from the latter on the application of the shock or impact. The structure of this damper coating is designed to dampen the impact under a reduced thickness.

20 Claims, 3 Drawing Sheets

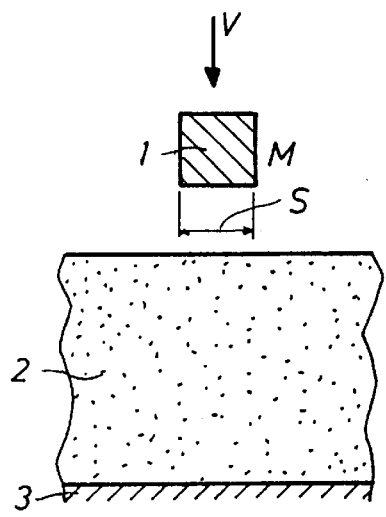
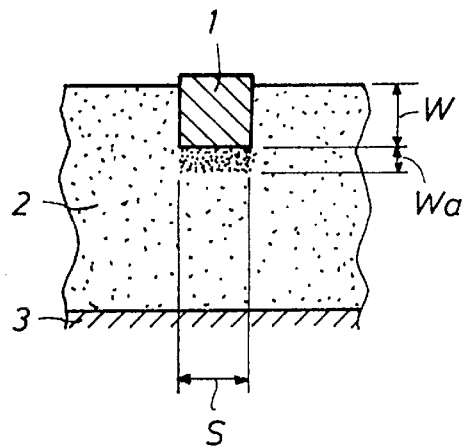
FIG.1a          FIG.1b
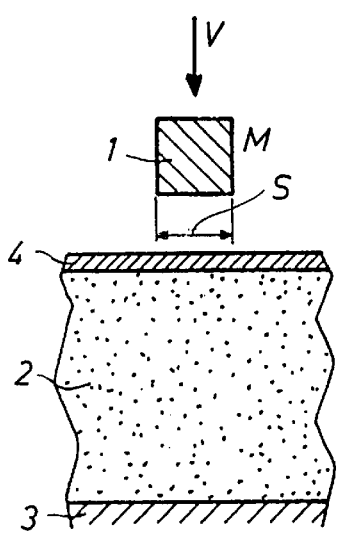
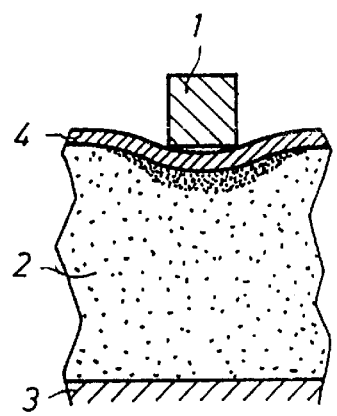
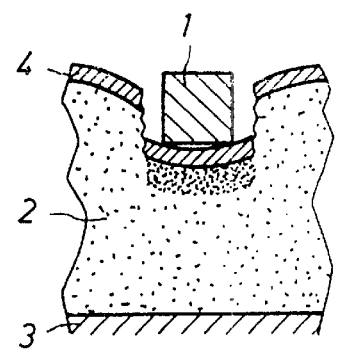
FIG.2a          FIG.2b          FIG.2c

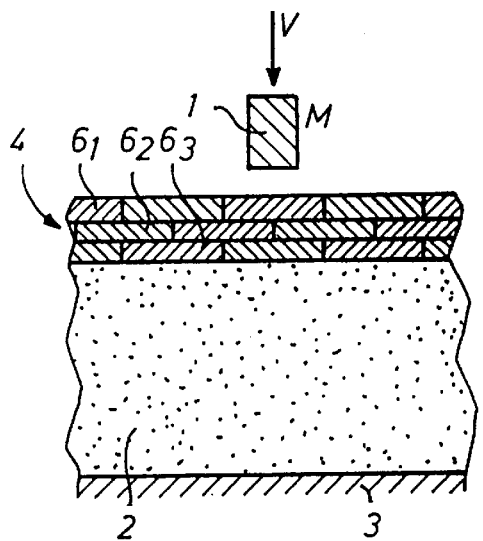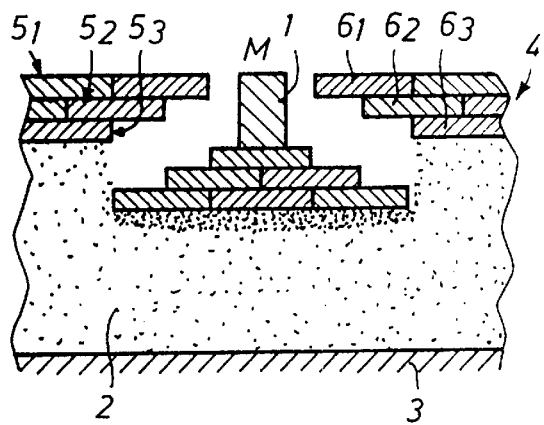
FIG. 4a    FIG. 4b
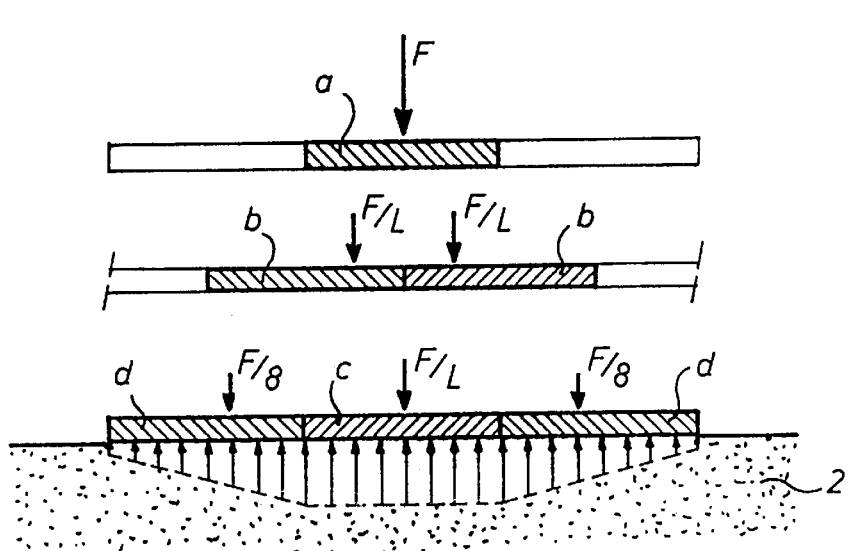
FIG. 5
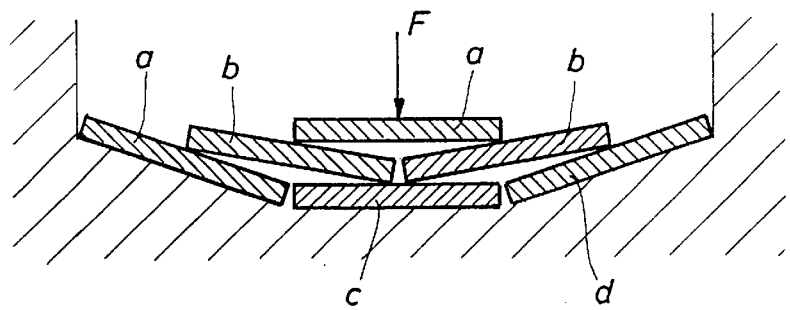
FIG. 6

SHOCK DAMPER COATING

BACKGROUND OF INVENTION

The present invention concerns shock damping and involves shock damper coatings intended to be applied in contact with an area to be protected.

Such coatings can have numerous applications. The following will be cited by way of example, without this list being in any way restrictive: the protection of objects in packaging, the protection of static or mobile installations against various kinds of projectiles (for example shrapnel, missiles, etc.), the protection of oil tankers, off-shore oil rigs and port terminals, against related objects, the protection of sensitive installations (nuclear power stations, hazardous plants) against crashing aircraft, and the protection of cable cars, etc.

Apart from protection against shocks in those types of applications just indicated, protective coatings according to the invention may likewise find applications in protection against explosions. However, as will appear later, the structure of the coating according to the invention has been developed to enable the crushing area of the coating to be widened with respect to the impact zone the result of this is that this coating will be useful where the shockwave caused by the explosion produces a localized impact. It may thus be a matter of protecting a ship's hull against the effect of mines or charges which act on contact with the hull.

When two bodies moving in relation to each other collide, the shock produces stresses at the point of impact, and these stresses deform the two moving bodies. These deformations are more or less severe, depending on the toughness of the body under consideration; moreover, for the smallest stresses (below the elastic limit, which varies according to the body, and may even vary according to the velocity of the impact), the deformation is reversible: the energy of the impact is absorbed by the deformation, then restored by repelling the "aggressor" moving body. Above the elastic limit the body is "crushable" and the deformation is irreversible. The energy of the impact is thus absorbed in the form of work required to produce the deformation (crushing, internal displacement, fractures, etc.). This mechanism is currently used to protect a surface or a volume against impacts with the aid of a layer of damping material.

Damping materials therefore exist, such as foams made of plastic material, glass or others, or products that are highly porous, such as stacks of hollow beads which absorb energy in proportion to the crushed volume, as illustrated in FIGS. 1a and 1b. FIG. 1a shows a moving body 1 at the instant of its falling onto a damping material 2 or crushing material covering a surface 3 to be protected. The moving body 1 penetrates the crushing material 2, and goes deep of a volume W of the crushing material 2, which slows it down (FIG. 1b). The energy absorbed corresponds to that required to compress this volume W of the crushing material 2 into a volume W/a, a being the crush coefficient. This crushed volume W/a is made to move ahead of the moving body 1, increasing as the latter advances until it stops, if the thickness of the crushing material 2 is sufficient, that is to say when the energy used up by compression is equal to the initial energy of the moving body 1. Otherwise, the surface to be protected 3 itself has to absorb the residual energy.

In the case of a material 2 whose crushing stress is $Y_e$, the advance X of the moving body 1 of mass M and velocity V, exerting the impact on a surface area S is approximately $$X = \frac{1}{2} \frac{MV^2}{Y_e S} \tag{I}$$

The crushing material 2 still not crushed transmits stresses to the surface to be protected 3, which it should be able to accept.

The thickness required to absorb the kinetic energy of the moving body ($\frac{1}{2}$ $MV^2$) is inversely proportional to the surface area S (see formula I).

In the mechanism just explained with reference to FIGS. 1a and 1b, the cross section of material which is affected by the compression phenomenon is more or less equal to the cross section S of the moving body 1. It is obviously preferable to cover the crushing material 2 by a skin 4, deformable but more rigid than the material, as is shown in FIG. 2a. FIGS. 2a, 2b and 2c illustrate the successive penetration of the moving body 1 into a crushing material 2 covered by skin 4. As can be seen in FIG. 2b, by accepting a certain deformation, the skin 4 widens the surface area of the absorbent zone. However, in the majority of cases this widening is extremely limited. In fact this skin 4 must have sufficient rigidity in order to crush the underlying material 2, but then the action of the moving body 1 on this rigid skin 4 creates, around the perimeter of the impact zone, a significant stress which produces tearing of the skin 4: the moving body 1 acts as a punch and the crushed zone is very slightly enlarged (FIG. 2c). It must therefore be very thick in order to absorb the incident energy.

The object of the present invention is to propose a damper coating, the structure of which is designed to dampen the impact under a reduced thickness.

SUMMARY OF THE INVENTION

The present inventor has in fact discovered that in giving the skin 4, such as described with reference to FIG. 2, a particular structure enabling it to produce a widening of the area loaded by the shock or impact, the stated object can be achieved with noticeable reductions in the thickness of the damper coating. This particular structure of the skin is based on the principle of layers of superimposed scales, the scales, contiguous, of the same layer being able to be connected, this connection being continuous for certain of the layers.

The first object of the present invention is therefore a damper coating for shocks produced by a collision, or impacts produced by a shockwave, said coating containing at least one layer of a crushing material intended to cover a surface to be protected, characterised in that the external layer of the crushing material is covered by a skin capable of providing a widening of the area affected by the shock or impact, said skin containing an overlapping arrangement of at least three layers of rigid material, each of said layers being composed of contiguous scales able to be interconnected by connecting means in such a way that they can go so far as to be broken when the shock or impact is applied, such a connection between scales of the same layer being able, furthermore, except where at least one median layer is involved, to go to the point of the continuity of said layer, and where any one layer of contiguous scales possibly connected but without going to the point of the continuity, is directly superimposed on a layer of the same type, the scales of one of these layers being offset with respect to the scales of the other layer. (It should be noted that this offset condition is in fact implicitly fulfilled in the case of constituent layers of the skin, which will be provided as being continuous).

According to one embodiment, among others, the skin of the damper coating according to the invention contains at least two layers, each formed of contiguous scales, connected or not connected (in other words, not continuous).

However, where any one layer of contiguous scales, connected or not connected, is superimposed on a layer of the same type, the scales of one of the layers are advantageously arranged in staggered rows with respect to the scales of the other layer.

BRIEF DESCRIPTION OF THE DRAWINGS

A simple embodiment of the skin of the damper coating according to the present invention will now be described with reference to FIGS. 3 to 6 of the attached drawing in which:

FIGS. 1a and 1b are cross sections of a moving body and a surface having a damping material, before and after impact, respectively.

FIGS. 2a, 2b and 2c are cross section of a moving body and a surface having a damping material and a skin, before, during and after impact, respectively.

FIGS. 4a and 4b roughly show the operation of this type of coating;

FIG. 5 is a schematic representation—which assumes perfectly rigid scales—illustrating the mechanism for transmitting the force of the shock to the layers of scales and the non-uniform distribution of the pressures created in the absorbent material; and FIG. 6 shows the result of this non-uniform stress distribution.

DETAILED DESCRIPTION OF THE INVENTION

Figure 3A:
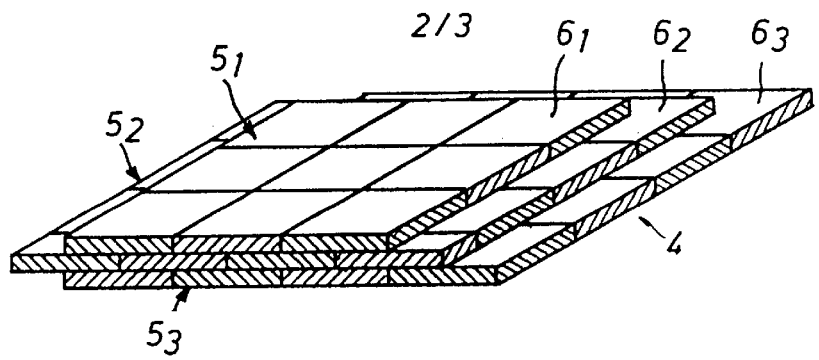
FIGS. 3a, 3b and 3c are partial schematic, sectional and perspective, top and exploded views, respectively, illustrating this simple embodiment.
Figure 3B:
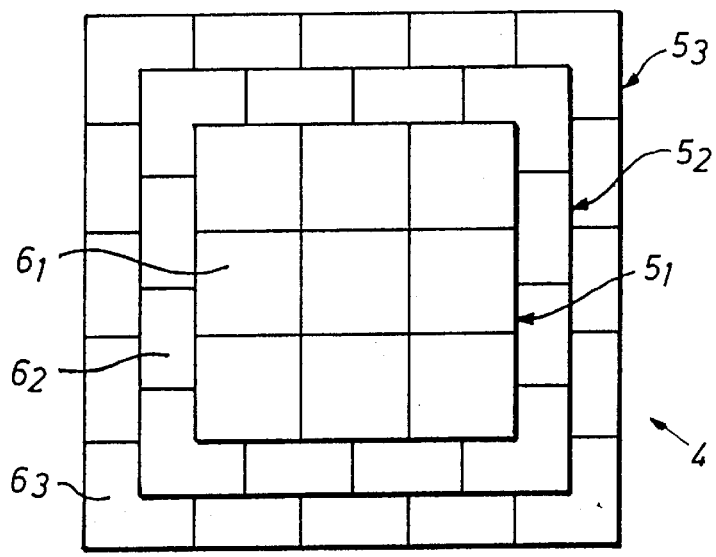
Figure 3C:
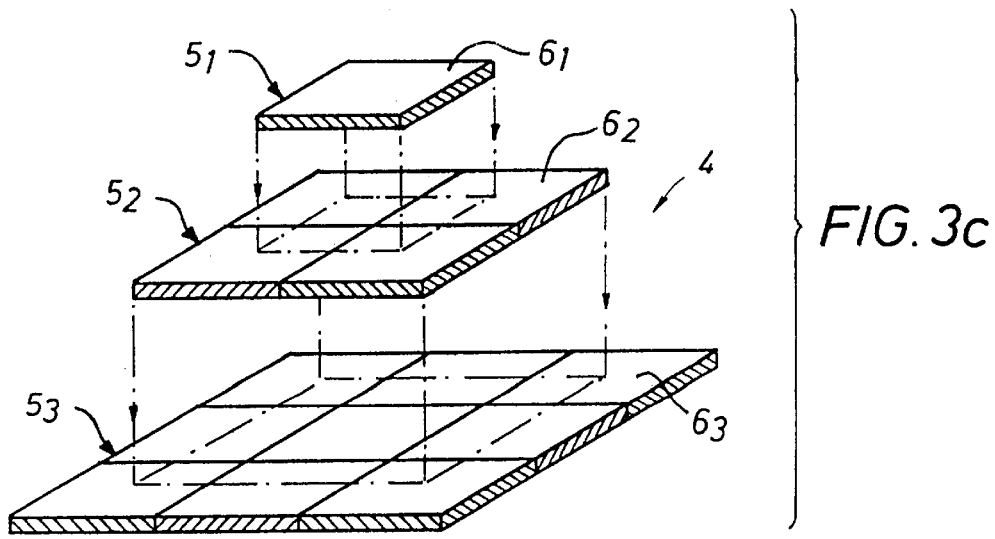

The skin shown in FIG. 3a, 3b and 3c is composed of three layers $5_1$, $5_2$ and $5_3$ each formed from scales $6_1$, $6_2$ and $6_3$, respectively. The scales are square-shaped and are arranged in rows which are staggered from one layer to the other.

The operation of this type of coating can be roughly described with reference to FIGS. 4a and 4b When the falling moving object 1 meets a first scale $6_1$, it carries the latter along with it and the resultant moving body comprising the moving body 1 and this scale $6_1$ has the same kinetic energy as that carried by the moving body 1. However, the movement of this first scale $6_1$ produces movement of the four scales $6_2$ located below (layer $5_2$), which themselves carry along the nine scales $6_3$ located in the following layer $5_3$ (FIG. 4b). The incident energy is partly used to move the fourteen scales which, with respect to a moving body of low mass and high velocity, may not be negligible. Moreover, the surface affected by crushing corresponds to the nine scales $6_3$ of the third layer $5_3$, which, all things being equal, enables the loads transmitted to the absorbent materials to be appreciably reduced.

However, the actual phenomenon is not as simple as FIG. 4 would suggest, and the coefficient of spread of the impact in the particular case under consideration is not 9 since it would result from the number of scales put into motion. In fact, FIG. 5 clearly shows that the force applied is very much reduced below the peripheral scales. If the moving body 1 exerts a force F on scale a, scale c actually transmits a centralized force F/4, and the lateral scales d a centralized force F/8.

This non-uniform distribution of the stresses tends to make the scales pivot, as is shown schematically in FIG. 6. It can be seen in this figure that the scales b are pinched between the scales a and c, and the effect of this pinching will be all the greater since the material located below will have a much greater crushing resistance. But the scales d themselves will tend to pivot. In so doing, they will tend to make the scales b pivot, this rotation opposing the pinching between the scales a and c, and tending to move scale c away from scale a. This is why it is of interest to provide a certain connection between the scales and especially between those of the last layer, given that if this connection is very strong in relation to the tensile strength of the material used for these scales, these will break instead of rotating. In certain cases, it is conceivable that this connection can advantageously go to the point of the continuity of the layer.

The mechanical properties of the material forming the scales therefore plays an important role and should be adapted to the particular case: energy of the moving body and surface area of impact, crushing resistance of the material situated below the scales (this should also be chosen in relation to what lies underneath). It is generally advantageous that the scales be made of a material with a relatively high modulus of elasticity. But the fracture of the scales, which is hardly a drawback compared to the impact (where the forces are highest), since it absorbs energy, may be worse than the deflection at the edges of the "piston" (where the stresses are weakest). There may have to be a compromise between modulus of elasticity and brittleness.

Thus, in order to obtain the skin of the damper coating according to the invention, it is generally worthwhile for the scales to be such that their mechanical strength is normally adequate for the stresses which are applied to them at the moment of impact, with movement being less than the value which would cause puncturing of the skin, the material forming the scales then advantageously being an elastic material not likely to reach its elastic limit when it is subjected to the stress due to the shock or impact. However, said skin can include scales likely to fracture, with absorption of energy under the direct effect of the impact, with movement. It can also be anticipated that the scales be such that they can resist fracture under the influence of lower stresses recorded at a lateral distance from the impact, while the greater stresses experienced at the impact are higher than those which would cause fracture of the scales, accompanied by absorption of energy; therefore this choice of values at the same time allows the lateral scales to continue to spread the impact, and the central scales to absorb energy by fracturing.

The dimensions chosen for the scales of the first layer (external layer) with respect to the dimensions of the impact (moving body M) also depend on the mechanical properties of the material chosen for this first layer in relation to the violence of the shock. A priori, it is worthwhile displacing the "piston" as much as possible, but if a certain area from this first layer is exceeded, the scale will be punctured and the effect of the distribution will be reduced. This observation results in the dimensions chosen for the scales of the first layer being smaller than the area of the impact of the moving body, corresponding as it were to the "puncturing", but it may be of interest to chose a larger dimension.

It has been seen that it was worthwhile establishing a certain link between the scales: if the material forming the scales is both rigid and ductile, it may even be worthwhile, particularly from the economic point of view, to make this first layer continuous.

The structure of the skin results in the impact being distributed from one layer to the other. The number of layers of scales therefore depends on the coefficient of spread that is desired for the impact in order to distribute its stresses. Other considerations, notably economic ones, may also play a part.

The scales are formed by plates which can have different shapes. If the expected impact is statistically symmetrical with respect to a point, it is preferable that the scales themselves have a shape which has a centre of symmetry and which enables a contiguous mosaic to be formed. The triangle, square and hexagon are regular polygons which meet these conditions and enable layers to be constructed, which advantageously distribute the load and widening in a progressive manner.

Depending on the circumstances, the scales can be produced with different materials such as, in particular, steel and metals, cement, concrete, glass, ceramic materials, plastic materials, composite materials, brick, stoneware and the like, this list not being restrictive.

The different layers of the skin of the coating according to the invention may not be realized with the same material nor with the same dimensions. In fact, the forces and stresses to which the scales of the successive layers are subjected are not the same. The initial impact, which is applied to one or more scales of the first layer, with perhaps stresses due to shock likely to fracture the material of the scale, is spread and dampened as it passes from one layer of scales to the following one. The choice of material and dimensions can therefore be optimized to each layer. Nevertheless, it is advisable to ensure that the mechanism for transmitting forces and moments described above is maintained because of its "piston effect", which is capable of carrying along an appreciable volume of the rushing material in dissipating the kinetic energy of the moving body.

Furthermore, as has been seen, the scales can include reciprocal connection means at least within the same layer, these means being capable of being broken if need be, with absorption of energy at the instant of the shock or impact, and being of a type of low-strength bonding material, coupling wires, lines of least resistance formed for example by embossing in a continuous mat following the pattern of the scales. Such an arrangement enables a continuous skin to be obtained all in one piece, which is often convenient in practice for the manufacture of the coating or for its application onto the surface to be protected. At the moment of impact, these temporary connecting means fracture while absorbing the energy. The main point is that the zone of least resistance is located at the periphery of the scales. It is for this reason that a collection of scales can be produced in the form of a continuous mat, where the separation of the scales is simply marked by embossing indicating the desired rupture lines.

With this same aim of producing a skin all in one piece, which can be easily handled for installation, at least one layer of scales of the coating can be maintained by a film or an envelope capable of being ruptured if need be, with absorption of energy at the instant of the shock or impact. It is not in fact necessary for this film or envelope to play a major role in the phenomenon of damping the impact.

In general the choice of crushing material, which also depends on the particular case under consideration, is influenced by the stress that the surface to be protected can withstand. It may involve an acceptable stress, irrespective of the area over which the impact is distributed (the knee of the motorist for example) or, in contrast, a stress which depends on the area to which it is applied and possibly on its point of application. For example, in the case of a sheet of concrete maintained at the periphery: the acceptable stress is all the weaker because the dimension of the sheet between its supports is large and because the distance from the point of impact to the periphery of the sheet is increased.

In every case it is necessary for the crushing pressure transmitted by the material, finally exerted on the surface to be protected, to be less at every point than this acceptable stress.

Depending on the circumstances, all kinds of energy-absorbing materials can therefore be used as the crushing material of the damper coating according to the invention. Of these materials, porous materials, such as concretes containing beads of expanded polystyrene, aerated materials, such as bundles of fibres, all kinds of foams of mineral materials or of plastic materials, cardboard, composites obtained from a binder and from beads or hollow microspheres of plastic material, glass, clays, ceramic material, honeycombs of different materials, gas-filled elastic envelopes, etc., without this listing being restrictive.

In certain cases, it is advantageous to employ several layers of crushing material with different mechanical characteristics. In fact, the effect of the spreading of the initial impact (primary impact) by means of the coating just described is to apply an impact (secondary impact) to its internal surface characterised by a value of the maximum stress at the centre, which is less than the stress applied by the initial moving body and distributed on either side. If, instead of applying this internal surface directly to the wall to be protected, it is applied to a new layer of coating of the same type as the previous one (a skin plus a shock-absorbing material), a new distribution and a new absorption of the impact will be produced. The structure of the skin and the choice of the shock-absorbing material of this second part of the coating must be matched to the characteristics of the secondary impact, which in turn will produce a tertiary impact. As the impact is thus transformed, it will even be possible to simplify the structure or structures of the coating. A separation between the layers comprised of a single stiff layer, elastic or not elastic, will suffice—as will be seen from the examples below. The invention therefore also concerns a protective coating as defined above, in which the crushing material is composed of several layers of energy-absorbing material, possibly separated by layers of hard and rigid material, layers which are continuous or composed of contiguous scales.

The appropriateness of dividing the shock-absorbing material into at least two different layers results from the fact that the material fulfills two functions. On the one hand it resists the breakthrough of the central scale by spreading the stresses (see FIG. 6), which implies that it is relatively resistant to crushing. On the other hand by its compression it absorbs the energy of the impact, which implies that it is relatively easy to crush. In certain cases it is advantageous to fulfil these two functions by means of two successive layers of the shock-absorbing material, the first with a relatively high crushing stress, the other with a lower crushing stress.

The examples below again illustrate the present invention.

EXAMPLE 1

A cylindrical mass of 200 kg, of average diameter of 300 mm, falls from a height of 11 metres onto a block of polyurethane foam with a thickness of 50 cm and 150 cm sides. The density of the foam is 0.2, the crushing resistance 3100 kPa.

The velocity of the impact is approximately 15 m/s.

After impact, the foam block has a circular imprint with a diameter of 300 mm and a depth of 34.4 mm. The deceleration of the moving body, measured by accelerometers, reaches 2300 m/s².

The same impact is then produced while protecting the foam block with three layers of square, non-reinforced concrete scales having 50 cm sides and a thickness of 4 cm, arranged in a square pattern on the same layer and staggered from one layer to the other. The upper layer of scales is covered by a 5 mm thick steel plate, which forms an external continuous layer of the skin of the damper coating according to the invention, receiving the impact. A certain amount of rebound is produced during the test. The maximum crushing is 7.1 mm and the measured deceleration reaches 5800 m/s².

Experimentally, in this case the use of the skin of scales in a relatively simple form reduces the crushed thickness by a factor of 4.85.

EXAMPLE 2

A projectile with a diameter of 81 mm is projected at approximately 170 m/s onto a rigid target. The maximum force exerted on the target is 138 kN. The energy of the moving body is 6700 J.

In the case of impact in a foam with a crushing resistance of 5 bar, not protected by a skin according to the present invention, the energy absorption would imply crushing of a thickness exceeding 2800 mm (see formula I).

This projectile was fired at a target composed of two layers, each with a thickness of 7.5 cm, of shock-absorbing material formed from hollow aluminium beads of 3 mm diameter (crushing resistance 5 bar), these two layers being separated by a layer of STADIP laminated glass (glass composed of two 3 mm thick sheets of glass separated by a 1 mm thick layer of polyvinyl butyral). Three layers of contiguous plates of AU 4 G aluminium alloy, 1.5 mm thick, arranged in a square pattern on the same layer and staggered from one layer to the other, were placed on the front face of the target.

It is noted that the maximum force of the impact, measured at the back of the target, is less than 30 kN, which is a reduction by a factor of 4.5. The scales are deformed but have not been punctured. The glass plate situated at the half depth of the crushing layer was deformed only at the centre by 21 mm, whereas if the target had not been composed of the crushing layer, perforation would have been noted.

The deformed area on the external layer of scales has a diameter of 200 mm, which signifies that the impact is spread over an area which exceeds 4.6 times the surface area of the projectile.

EXAMPLE 3

A concrete enclosure with a radius of 20 cm and a thickness of 55 cm is to be protected against crashing aircraft. The projectile is assumed to weigh 13 tonnes. The velocity of the impact is 600 km/h.

Calculations and experiments on a reduced scale have shown that the protection of the enclosure could be obtained by arranging on the enclosure a damper coating composed thus, starting from the wall to be protected:

a 60 cm thick layer of a material with a crushing resistance of 4 bar, composed of 3 mm diameter MICRO-CEL aluminium beads, lightly agglomerated by a mineral binder;

a 5 cm intermediate layer of high-performance concrete, with a density of 2.45, containing 30 kg/m³ of fibres, marketed under the name of FIBRAFLEX by the Pont-à-Mousson company, with a modulus of elasticity of 28 000 MPa;

a 40 cm thick layer of a crushing material formed from light concrete, with a density of 0.7, containing expanded polystyrene beads, giving it lightness and crushing capacity, and FIBRAFLEX amorphous cast iron fibres to provide reinforcement; this concrete had a crushing resistance of 20 bar; and a skin formed from 3 superimposed layers of scales with sides of 2 metres and a thickness of 5 cm, made with the above-mentioned very high-performance concrete, and arranged as in the case of Examples 1 and 2, the scales of the first and third layers being interlocked by reinforced concrete joints, whose reinforcement is inserted into the scales at the time of their manufacture.

If the damper coating contains only crushing material it will be necessary to provide the latter with a thickness of several metres.

EXAMPLE 4

A 5 mm thick wall of steel is to be protected against a 5 kg piece of shrapnel with an impact area of 0.8 dm², at a velocity of 15 m/s.

For this purpose, it is protected with the aid of a 10 cm layer of polystyrene foam with a crushing stress of 8 bar, coated with a skin composed of three layers of scales with sides of 5 cm and a thickness of 5 mm, arranged in a staggered rows as in the previous examples, the upper layer being composed of steel scales, and the other two of glass scales. Similar protection was obtained in the following three cases: by replacing the upper layer by a continuous steel sheet; by replacing the lower layer, adjacent to the foam, by contiguous panes of glass with dimensions substantially greater than 5 cm (which more or less reverts to the use of a continuous pane); and by replacing at the same time the first and third layers of scales by the steel sheet and the glass pane, respectively.

EXAMPLE 5

A 5 mm thick steel wall is to be protected against magnum 144 bullets weighing 16 g and travelling at a velocity of 440 m/s, with the aid of a 7.5 cm thick layer of absorbent material, the crushing stress of which is 20 bar, covered by three layers of duralumin scales, with 5 cm sides and a thickness of 3 mm, arranged in staggered rows as in the preceding examples.

It is understood that the embodiments described above are not in any way restrictive and could lead to any desirable modifications, without going beyond the scope of the invention.

I claim:

1. A coating for protecting a surface of an inanimate object from a shock, comprising:

a crushing material proximate to the surface; and a rigid skin covering the crushing material, the skin including a first layer of rigid material adjacent to the crushing material and a second layer of rigid material proximate to the first layer, at least one of the layers having lines of least resistance for forming scales.

2. The coating of claim 1, wherein the scales have a shape which has a center of symmetry.

3. The coating of claim 2, wherein the shape of the scales is a regular polygon.

4. The coating of claim 1, further comprising lines of least resistance on both the first and the second layers for forming scales on each layer.

5. The coating of claim 5, wherein the lines of least resistance of the second layer are staggered with respect to the lines of least resistance of the first layer so that an area of impact on the second layer is enlarged to a greater area of impact on the crushing material by the first layer.

6. The coating of claim 6, wherein the rigid material is selected from the group consisting of cement, concrete, metals, steel, glass, ceramic materials, plastic materials, composite materials, brick and stoneware, the first and second layers being of either the same or different rigid material.

7. The coating of claim 1, wherein the second layer is superimposed directly on the first layer.

8. The coating of claim 1, further comprising a third layer proximate to the second layer.

9. The coating of claim 7, wherein the rigid material is selected from the group consisting of cement, concrete, metals, steel, glass, ceramic materials, plastic materials, composite materials, brick and stoneware, the first and second layers being of either the same or different rigid material.

10. The coating of claim 1, wherein the lines of least resistance are provided by coupling wires.

11. The coating of claim 1, wherein the lines of least resistance are provided by embossing.

12. The coating of claim 1, wherein the lines of least resistance are provided by scoring.

13. The coating of claim 1, wherein the lines of least resistance are provided by a film.

14. The coating of claim 1, wherein the lines of least resistance are provided by an envelope.

15. The coating of claim 1, wherein the lines of least resistance are provided by perforations.

16. The coating of claim 1, wherein the crushing material is an energy-absorbing material selected from the group consisting of porous material, concrete, porous concrete, concrete containing beads of expanded polystyrene, concrete containing beads of foam, aerated materials, bundles of fibers, foams of mineral materials, foams of plastic materials, cardboard, composites obtained from a binder and beads, composites obtained from a binder and hollow microspheres of plastic material, glass, clay, ceramic material, honeycombs of different materials, and gas-filled envelopes.

17. The coating of claim 16, wherein the crushing material includes first and second layers, the first layer having a higher crushing stress than the second layer.

18. The coating of claim 1, further comprising a third layer of rigid material superimposed directly on the second layer, wherein the second layer is superimposed directly on the first layer.

19. A shock damper coating for a surface to be protected, comprising:

a layer of a crushing material proximate to the surface; and a rigid skin covering the crushing material,
the skin comprising first, second and third layers of scales, the scales of one layer being offset from the scales of the other layers, the first layer being adjacent to the crushing material, the second layer being mounted directly to the first layer, the third layer being mounted directly to the second layer.

20. A coating for protecting a surface from the impact of a shock, comprising:

a layer of a crushing material selected from the group consisting of porous material, concrete, porous concrete, concrete containing beads of expanded polystyrene, concrete containing beads of foam, aerated materials, bundles of fibers, foams of mineral materials, foams of plastic materials, cardboard, composites obtained from a binder and beads, composites obtained from a binder and hollow microspheres of plastic material, glass, clay, ceramic material, honeycombs of different materials, and gas-filled envelopes, the crushing material being proximate to the surface; and a rigid skin covering the crushing material, the skin including a first layer of rigid material adjacent to the crushing material and a second layer of rigid material proximate to the first layer, at least one of the layers comprising contiguous scales where adjacent scales are coupled together.

* * * * *